US008028293B2

(12) United States Patent
Azar et al.

(10) Patent No.: US 8,028,293 B2
(45) Date of Patent: Sep. 27, 2011

(54) OPTIMAL POLICIES FOR LOAD BALANCING FOR DISTRIBUTED AND STRATEGIC AGENTS (MORE TECHNICALLY, OPTIMAL COORDINATION MECHANISMS FOR MACHINE SCHEDULING)

(75) Inventors: Yossi Azar, Redmond, WA (US); Kamal Jain, Bellevue, WA (US); Seyed Vahab Mirrokni, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 11/770,667

(22) Filed: Jun. 28, 2007

(65) Prior Publication Data

US 2009/0007101 A1    Jan. 1, 2009

(51) Int. Cl.
*G06F 9/46* (2006.01)
*G06F 15/173* (2006.01)
(52) U.S. Cl. .................. 718/105; 718/102; 709/226
(58) Field of Classification Search .................. 718/102, 718/105; 709/226
See application file for complete search history.

(56) References Cited

U.S. PATENT DOCUMENTS

| 5,170,340 | A  | * | 12/1992 | Prokop et al. ............. 700/23 |
| 5,325,526 | A  |   | 6/1994  | Cameron et al. |
| 6,115,745 | A  |   | 9/2000  | Berstis et al. |
| 6,175,869 | B1 | * | 1/2001  | Ahuja et al. .............. 709/226 |
| 2004/0243996 | A1 |   | 12/2004 | Sheehy |
| 2005/0022187 | A1 |   | 1/2005  | Park |
| 2006/0046658 | A1 |   | 3/2006  | Cruz et al. |
| 2007/0039001 | A1 |   | 2/2007  | Briccarello et al. |
| 2007/0041364 | A1 |   | 2/2007  | Kakadia |

OTHER PUBLICATIONS

Suri et al., "Selfish Load Balancing and Atomic Congestion Games", Jun. 27-30, 2004, SPAA '04, pagees 188-195.*
Shan, et al. "Job Superscheduler Architecture and Performance in Computational Grid Environments," Association for Computing Machinery, http://crd.lbl.gov/~oliker/papers/SC03_gridsched.pdf, Nov. 12, 2003, 15 pages, Phoenix, Arizona.
Immorlica, et al, "Coordination Mechanisms for Selfish Scheduling," https://research.microsoft.com/~nickle/pubs/coordmech.pdf, last accessed Apr. 2, 2007, 15 pages.
Kathiresan. "Adaptive Distributed Load Balancing for Heterogeneous Computing System using Global Scheduler Policy," IBM India Pvt. Ltd. India Software Labs, High Performance Computing and Research, http://www.comp.brad.ac.uk/het-net/tutorials/P19.pdf, last accessed Apr. 2, 2007, 8 pages.
Malik. "Dynamic Load Balancing in a Network of Workstations," 95.515F Research Report, http://www.cs.toronto.edu/~smalik/downloads/paper_515.pdf, Nov. 29, 2000, 16 pages.

* cited by examiner

*Primary Examiner* — Qing Wu
(74) *Attorney, Agent, or Firm* — Lee & Hayes, PLLC

(57) ABSTRACT

Providing for scheduling tasks in a distributed system based on an inefficiency of each task on a particular machine as compared with available networked machines is described herein. By way of example, a distribution component can receive a plurality of tasks at a machine assigned by at least one independent agent. In addition, an ordering component can schedule each task on a machine as a function of non-decreasing inefficiency. Such a policy can be implemented locally at the machine, minimizing inter-device communication, while only marginally increasing completion time for the set of tasks. In such a manner, the subject disclosure provides for load balancing of distributed systems in a manner that utilizes fewer resources than conventional approaches.

22 Claims, 13 Drawing Sheets

|   | 1 | 2 | 3 | 4 |
|---|---|---|---|---|
| A | 20 | ∞ | ∞ | ∞ |
| B | 2 | 12 | ∞ | 1.98 |
| C | 4 | 24 | 25 | 3.95 |
| D | 5 | 28 | ∞ | 4.9 |

FIG. 5

OPTIMAL POLICIES FOR LOAD BALANCING FOR DISTRIBUTED AND STRATEGIC AGENTS (MORE TECHNICALLY, OPTIMAL COORDINATION MECHANISMS FOR MACHINE SCHEDULING)

BACKGROUND

One of the greatest modern enhancements to electronic processing and computing has been distribution of processing, storage, and like resources across remote distances and disparate devices. Access to data, applications, processes, databases, and the like has grown commensurate with an expansion of distributed networks. The success of transmission control protocol/Internet protocol (TCP/IP) electronic communication utilized with large networks, such as the Internet, has been an important contributor to enabling such distribution. In addition, the development of algorithms that can distribute resources of multiple servers amongst multiple clients has also aided the advancement and application of such distributed networks. As a result of such advancements, shared computing has become a viable and powerful tool in modern computing.

As with most automated computer processes, the introduction of shared computing has also fostered a desire to optimize such process. Load balancing of various assigned tasks amongst distributed machines and/or processes is one such example. Load balancing can be roughly characterized as an attempt at minimizing resources required to complete a certain number of tasks on a finite number of distributed machines. In some examples, the machines are able to intercommunicate with each other to best determine a mechanism with which to share and optimize resources; other examples restrict the machines to only that information that is locally available. Such restricted mechanisms can be termed non-cooperative or independent processes.

An example of a non-cooperative process can include a system having multiple distributed machines on a wired or wireless network, assigned a set of tasks. Load balancing desires to assign tasks to the distributed machines in such a manner as to minimize the completion time of all tasks. One method of achieving such goal is to design local scheduling policies that result in the desired load balancing. An advantage of local policies, e.g., policies enforced utilizing information local to a process, occurs in minimizing communication overload among distributed portions of a system. In many distributed systems, there are rational agents independently responsible for tasks of the set of tasks, who are selfishly motivated. In other words, each agent can schedule tasks independently to minimize their own completion time. In the context of such a system, one goal has been to develop local scheduling policies that motivate these individual agents to act both selfishly and in a manner that minimizes the completion time of the entire set of tasks. A solution is desirable if it can partially minimize communication amongst various machines and processes while only marginally increasing the completion time of the set of tasks when compared with cooperative systems.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in various aspects thereof, provides for scheduling tasks in a distributed system based on an inefficiency of each task on a particular machine as compared with available networked machines. A distribution component can receive a plurality of tasks at a machine assigned by at least one independent agent. In addition, an ordering component can schedule each task on a machine as a function of non-decreasing inefficiency. Such a policy can be implemented locally at the machine, minimizing inter-device communication, while only marginally increasing completion time for the set of tasks. In such a manner, the subject disclosure provides for load balancing of distributed systems in a manner that utilizes fewer resources than conventional approaches.

In accord with additional aspects of the subject disclosure, an inefficiency based task scheduling mechanism can be combined with traditional scheduling algorithms to ensure convergence to Nash equilibria while decreasing price of anarchy with respect to such traditional algorithms. A partition component can sub-divide a machine or process into log (m) virtual machines and/or processes. Tasks assigned to the machine can be distributed amongst the virtual machines/processes as a function of task inefficiency, an overall number of processes available, and an instance value of the particular virtual machine/process. Ordering of completion of such distributed tasks can be based on a calculated inefficiency combined with traditional shortest-first or random-order scheduling policies. The combined algorithms ensure that a distributed system converges to pure Nash equilibria while price of anarchy is bounded by $\log^2$ (m), where m is equal to the number of machines available in the distributed system.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION OF THE DRAWINGS

FIG. 5 depicts an example system for coordinating traditional scheduling policies with an inefficiency based policy to ensure convergence to pure Nash equilibria in accord with aspects of the subject innovation.

DETAILED DESCRIPTION

Figure 1:
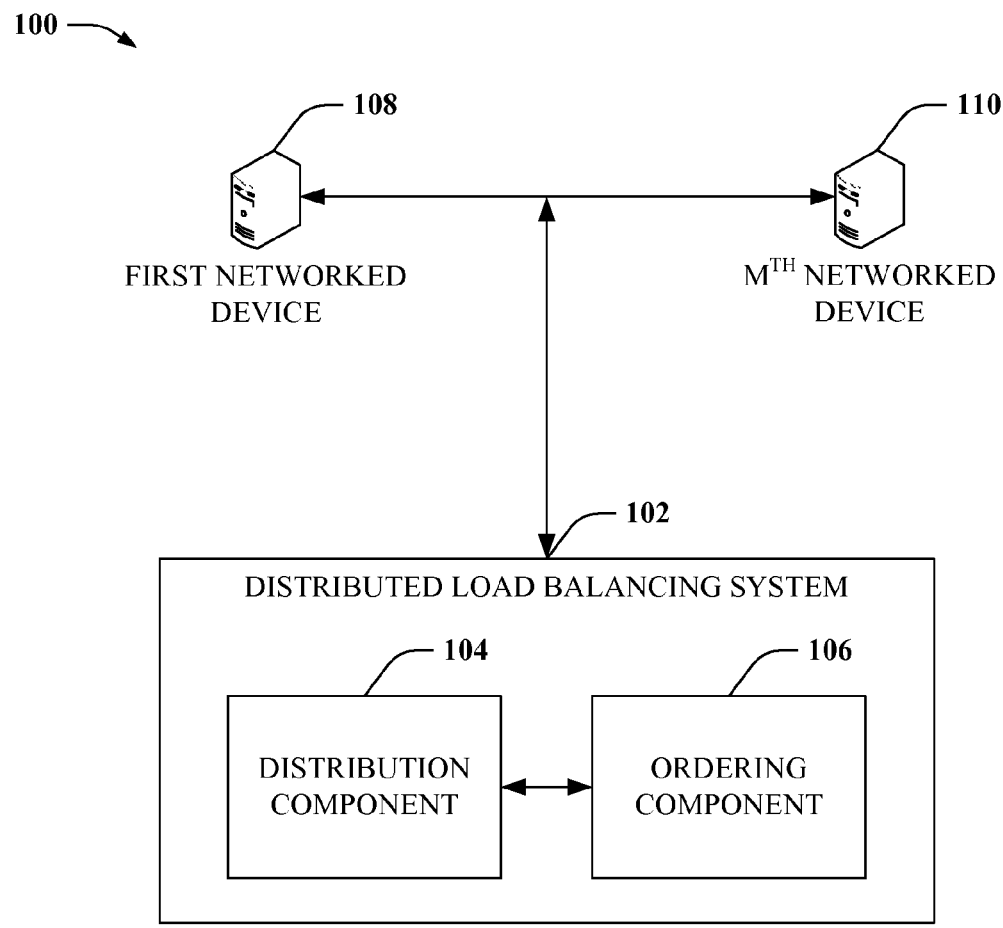
FIG. 1 illustrates an exemplary high level block diagram of a system that minimizes run time of distributed tasks in accord with aspects of the claimed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, an exemplary high level block diagram is depicted of a system 100 that can minimize run time of distributed tasks allocated to one or more devices (108,110) in accord with aspects of the claimed subject matter. System 100 can relate to applying local policies for task scheduling that can minimize inefficiency associated with resulting equilibria. More particularly, system 100 can enforce inefficiency-ordered coordination mechanisms for unrelated machine scheduling to improve an overall completion time with respect to traditional implementations.

Distributed load balancing system 102 can receive one or more tasks at one or more devices of a network and enforce policies for processing those tasks. More specifically, a distribution component 104 can receive a plurality of tasks assigned by at least one self-interested agent (not depicted) to a machine (108) on a network of a plurality of machines (108, 110). Such tasks can include any suitable electronically process-able application, function, communication, or the like. Examples can include print jobs distributed by multiple networked computers, network searches distributed to networked search engines, and web-based purchases proffered to various servers configured to verify supplier inventory and/or purchaser credit, for instance. It should be appreciated that the foregoing examples should be not be construed to limit application of the subject innovation. Other suitable examples known in the art or made known to one of skill in the art by way of the embodiments articulated in the subject disclosure are contemplated as part of the specification and incorporated herein.

System 100 can also include an ordering component 106 that can schedule each of the plurality of tasks (e.g., received by the distribution component 104) for processing on the machine (108) in a non-decreasing order of task inefficiency. Task inefficiency can relate to a time to complete a task on a particular device (108) as compared to a minimum time required to complete the task on any suitable available device including, e.g., first networked device 108, and subsequent network devices up to an $M^{TH}$ networked device 110, where M is an integer. A mathematical discussion of the task inefficiency parameter is presented in more detail below.

In accord with such definition, task inefficiency of a task can increase proportionate with a concurrent processing time of a 'desired' machine (e.g., due to inherent capabilities of the desired machine, or like circumstance), and further increases inversely proportionate with the speed with which another available device is capable of completing the task. In other words, the task inefficiency not only imposes a completion time penalty based on the concurrent schedule of a chosen device but also on a speed with which a non-chosen devices can complete the task. By scheduling tasks based on task inefficiency, system 100 can directly motivate selfish agents to distribute tasks to faster and/or less crowded machines, thereby decreasing a global time to complete a number of tasks on a number of devices. In addition, inefficiency-based scheduling requires no coordination of scheduling times amongst devices, and consequently can be implemented by policies that are limited to information local to a device.

A local policy is one scheduling mechanism for reducing completion time of scheduled tasks. Local policies are instruction mechanisms that generally schedule tasks on a device (108) utilizing information local to the device, such as information particular to the tasks assigned to the device (108). For example, if there are 10 devices on a network (e.g., for M=10 at $M^{TH}$ networked device 110), a local policy of a first networked device 108 can be restricted from accessing information pertaining to the other 9 devices. (e.g., 110). Local policies are therefore uncoordinated amongst devices assigned a group of tasks, and as such typically bear some efficiency cost as a result of the lack of coordination. Such cost can be represented by an approximation factor, or price of anarchy Θ, and can generally be defined as an optimal time (or related unit of measure) for a fully coordinated system to complete a set of tasks divided by an optimal time for the unrelated system (e.g., limited to local policy scheduling) to complete those same tasks.

In addition to local policies, other scheduling mechanisms can be utilized by system 100, such as a strongly local policy. A strongly local policy can generally schedule a task at a device (108) only as a function of the processing times of tasks assigned to the device (108). As such, a strongly local policy is less coordinated version of a local policy that typically has a larger price of anarchy associated with it.

In accord with additional aspects of the subject innovation, system 100 can decrease an approximation factor associated with unrelated local scheduling as compared with conventional scheduling mechanisms. For example, a shortest first policy that schedules tasks in order of increasing processing time, and a random-order policy that schedules assigned tasks randomly, are both relatively inefficient, conventional strongly local policies. In particular, examples exist for these policies that result in very poor equilibrium points (e.g., see FIG. 2, infra for a more detailed discussion). More specifically, traditional strongly local policies such as the shortest-first and random-order policies have a price of anarchy equal to m*O, or Θ(m). In sharp contrast, however, system 100 can provide for ordering of tasks for the plurality of devices (108, 110) with a price of anarchy equal to log m*O, or Θ(log m), substantially decreasing global completion time for an unrelated system.

Figure 2:
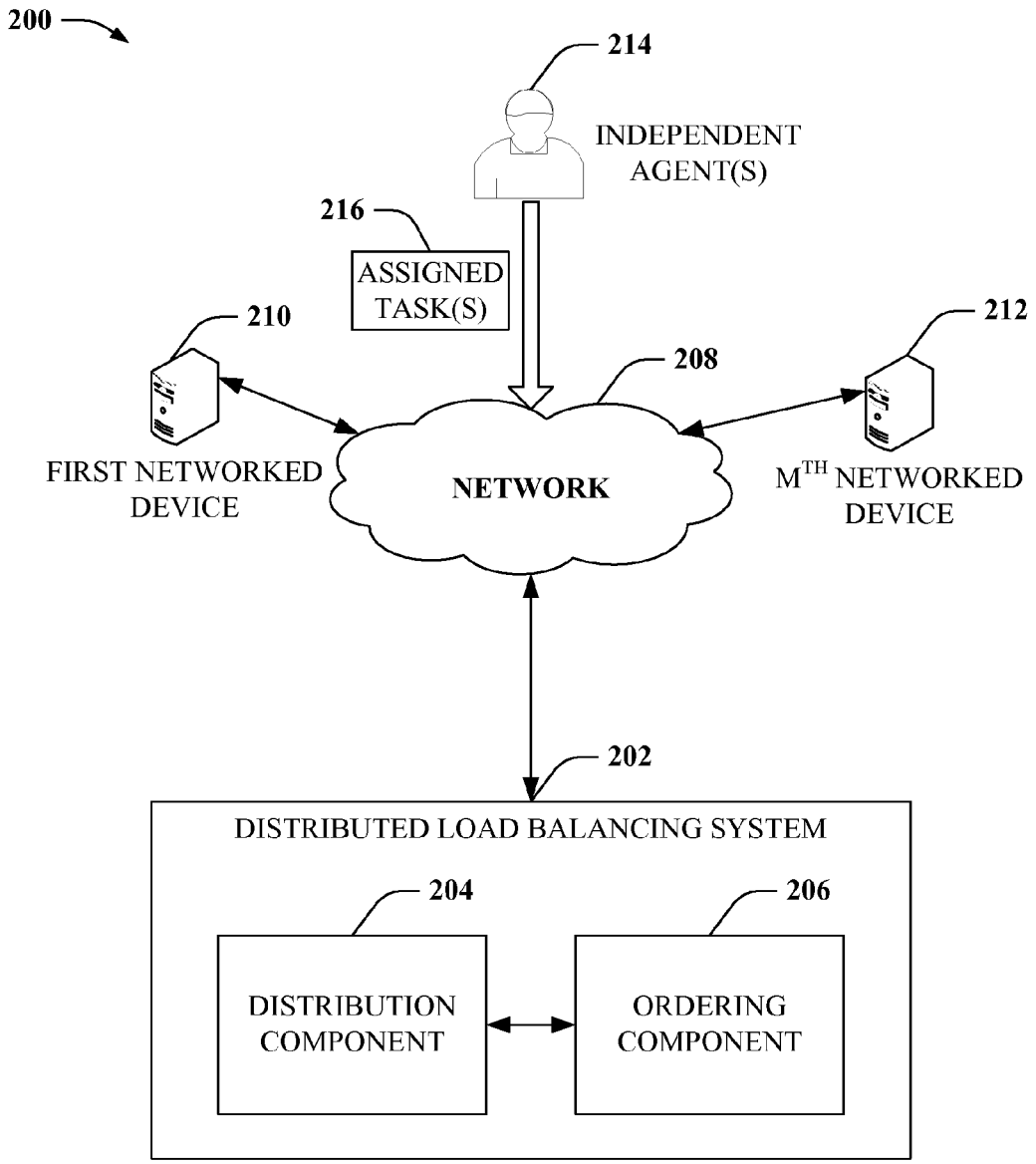
FIG. 2 depicts a sample block diagram of a distributed system in accord with aspects of the claimed subject matter.

FIG. 2 illustrates a system 200 that can improve task (216) completion time for an unrelated distributed network (208) in accord with aspects of the subject innovation. Distributed load balancing system 202 can receive and distribute tasks 216 to a plurality of non-cooperative devices (210, 212), and establish scheduling policy based on non-decreasing order of inefficiency. As a result, distributed load balancing system 202 can decrease the global completion time of tasks 216 on devices 210, 212, and also decrease a corresponding price of anarchy with respect to conventional strongly localized policy mechanisms from Θ(m) to Θ(log m). It should be appreciated that although distributed load balancing system 202 is depicted as a separate entity from network 208 and devices (210, 212) connected thereon, components of such system (204, 206) can be located proximate network 208, proximate one or more devices (210, 212) coupled by network 208, a separate entity, or comprised of interactions between such entities or combinations thereof.

More specifically, system 200 can include a distribution component 204 that can receive a plurality of tasks assigned by at least one self-interested agent (not depicted) to a machine (108) on a network of a plurality of machines (108, 110). In addition, system 200 can include an ordering component 206 that can schedule each of the plurality of tasks (e.g., received by the distribution component 104) for processing on the machine (108) in a non-decreasing order of task inefficiency. Task inefficiency for a task i (216) on a device j (108, 110) can be represented mathematically as follows: for each device j and task i, $p_{ij}$ can be equal to a processing time of task i on device j. In addition, let $m_j$ be equal to the shortest processing time $p_{ij}$ of task i on any device j (210, 212) of network 208, or $$m_j = \min_j p_{ij}.$$

The inefficiency ($e_{ij}$) of task i for device j, can be defined as time to complete a task on a particular device ($p_{ij}$) divided by a minimum time required to complete the task on any suitable available device ($m_j$) and can be expressed mathematically as follows:

$$e_{ij} = \frac{p_{ij}}{m_j}$$

Where $e_{ij} \geq 1$ for all i and j.

Network 208 can include any suitable mechanism for communicatively coupling electronic computing and/or logical devices (e.g., first networked device 210 ... $M^{TH}$ networked device 212), such as a peer to peer network, transmission control protocol/Internet protocol (TCP/IP) based network, Ethernet network, or like network such as the Internet or a public or private intranet. Devices (210, 212) connected via network 208 can process individual assigned tasks via typical electronic processing techniques (e.g., storing data in memory, utilizing a processor, thread of execution, or the like to manipulate the data based on a logical criteria, instruction, etc.) Specifically, first networked device 210 can be such a device assigned one or more tasks 216 for completion. Additional devices, up to and including an $M^{TH}$ networked device 212 can also co-exist on network 208 and can be assigned one or more tasks 216 for completion. It should be appreciated that such devices (210, 212) can have different processing resources, processing speeds, allotments of tasks, etc., that can impact completion time of a particular task $p_{ij}$. It should also be appreciated that devices (210, 212) on network 208 do not cooperate with each other to reduce global completion time of assigned task(s) 216 (e.g., such devices do not intercommunicate so as to dynamically allocate tasks in accordance with concurrent device processing time and capacity). As such, network 208 and devices 210 and 212 constitute an unrelated network system.

Independent agent(s) 214 is an entity that is responsible for a particular task of assigned task(s) 216. More specifically, independent agent 214 can include a client device interacting with a server device (210, 212) for completion of a task (216), a personal computer (PC) carrying out instructions utilizing network resources, or the like. It should be appreciated that independent agent(s) 214 can assign a task (216) to any device (210, 212) on network 208. As discussed in more detail below, independent agent(s) 214 typically attempt to minimize completion time associated with their own task (e.g., based on processing capability, quality, number of tasks in queue, etc., associated with devices 210, 212) without regard for global completion time of all tasks. As depicted, system 200 can employ a non-decreasing order of inefficiency based policy for unrelated network devices and reduce global completion time with respect to conventional mechanisms.

The following includes a discussion of unrelated systems, game theory, and conventional ordering solutions to further illustrate aspects of the subject innovation and of system 200. Specifically, an unrelated device network will typically utilize local policy or strongly local policy task ordering. The unrelated device problem, or $R\|C_{max}$, can have m machines and n users, where user i (i=1, . . . , n) has a job that can be assigned to any machine. Task i for i=1, . . . , n is associated with an m-vector $\vec{p}_i$, where $p_{ij}$ indicates a processing time of job i if assigned to device j. For a particular $R\|C_{max}$ scenario, a global optimum, O, can also be defined as a particular assignment of i jobs to m devices that minimizes the time to complete the jobs.

Optimal local scheduling can typically be described utilizing aspects of game theory and Nash equilibria as follows. Given a particular assignment of tasks (216) to devices (108, 110), a makespan of a schedule of tasks at a device (108, 110) (e.g., implemented by ordering component 206) is defined as the maximum time required to complete any assigned task. An optimal assignment, O, as discussed at FIG. 1 above, minimizes the makespan.

Each assigned task 216 is owned by an agent 214 that can assign the task to a device (108, 110) independently of other assignments and with selfish motives (e.g., to minimize their own task completion time without regard to other task completion times or global completion time). An agent's 'best response' is a strategy that minimizes a completion time associated with the agent's task. A Nash equilibrium is a vector of agent strategies defining the best strategy of each agent given the strategies of other agents. Consequently, if a set of tasks has converged to a Nash equilibrium, no agent can unilaterally re-schedule its task in order to decrease the completion time of the task.

Within the construct described above, any set of local policies on devices (108, 110) can define a game among agents. The price of anarchy $\Theta$ of a set of local policies is the worst ratio between the makespan of a Nash equilibrium assignment and an optimal assignment. Traditional strongly local policies, such as the shortest-first or random-ordered policies, have a price of anarchy equal to m*O, or $\Theta(m)$, in sharp contrast to that of system 200 (e.g., $\Theta(\log m)$).

A lower bound price of anarchy, having poor equilibrium points, for the shortest-first policy can be illustrated by the following example (e.g., the completion time of Nash equilibrium points is at least m*O). Any deterministic non-preemptive policy satisfying the independence of irrelevant alternatives (IIRA) property is an ordering policy. As a preliminary matter, a policy is non-preemptive if it processes each job in an un-interrupted fashion without delay. A policy satisfies the IIRA property if, for any two tasks contained within a set of tasks, the fact that one task has a smaller completion time than the other task is unchanged by the availability of a another task k For any strongly local ordering policy, the price of anarchy is at least $\Omega(m)$. Let:

$$n_j = 2(m-1)!(j-1)! \text{ for } 1 \le j \le m \text{ and } n = \sum_{j=1}^{m} n_j.$$

Also assume a set of m devices and a set $P_1, \ldots, P_m$ of strongly local ordering policies on these m devices. Given this set of policies, an instance of n tasks can be constructed for which the price of anarchy is $\Omega(m)$. As described with regard to FIG. 1, supra, because policy $P_j$ is a strongly local ordering policy, it can only utilize processing time of tasks on device j and the IDs of those tasks. As a result, if the processing time of all tasks on device j is equal to $(j-1)!(m-1)!$, $P_j$ can schedule the tasks based on a global ordering of task IDs. Let $\sigma_j$ be the global ordering of task IDs. An instance can be constructed in which all tasks that can be scheduled on device j have the same processing time, specifically $(j-1)!(m-1)!$.

Given any ordering a on the IDs of n tasks, a set $T \subset \{1, \ldots, n\}$ of task IDs, and a number k, let $\sigma^k(T)$ be the set of first k IDs in ordering $\sigma$ that are in set T. In particular, $\sigma^k(\{1, 2, \ldots, n\})$ is the set of first k IDs in an ordering $\sigma$. Also, for $1 \le j \le m$, let $$w_j = \sum_{t=1}^{j} n_t.$$

Next a family of subsets is defined, $S_1, \ldots, S_m$ where $S_j$ is the set of tasks of type j as follows: $S_m$ is the set of last $n_m$ IDs in the ordering $\sigma_m$, i.e., $$S_m := \{\sigma_m(n), \sigma_m(n-1), \ldots, \sigma_m(n-n_j+1)\}$$

Let:

$$M_m = \{1, 2, \ldots, n\} \backslash S_m.$$

Also, for each j ($m-1 \ge j \ge 1$):

$$M_j := \sigma_j^{w_j-1}(M_{j+1}), \text{ and } S_j := M_{j+1} \backslash M_j.$$

Therefore, $|S_j| = n_j$ for $1 \le j \le m$.

Consider the following instance of $R\|C_{max}$ on n tasks. The n tasks are partitioned into m different types where for each j, $S_j$ contains all tasks of type j. Tasks of type j (in $S_j$) can be scheduled only on devices j and j+1 for $1 \le j \le m$ (tasks of type m can only go to device m). The processing time of all tasks on device j is $(j-1)!(m-1)! = 2n_j$. Assume the price of anarchy of this instance is $m^2$.

An optimal solution of this instance $R\|C_{max}$ schedules tasks of set $S_j$ on device j for $1 \le j \le m$. The makespan of this schedule is $2n_jn_j=2$. In any pure Nash equilibrium of this instance, the makespan of device j is equal to j. In particular, half of the tasks of $S_j$ are scheduled on device j and half of them are scheduled on device j+1. This statement is proved below by induction on j.

By the construction of $S_j$'s for $1 \leq j \leq m$, policy $P_j$ puts all tasks of $S_j$ after all tasks of $S_{j-1}$ on device j, since all tasks of $M_j$ go before all jobs of $S_j$ on machine j and $S_{j-1} \subset M_j$. By induction on j, for the base of the induction define $\overline{S}_0$ as an empty set and device 0 as a dummy device. For the induction hypothesis, assume that for $k \leq j-1$, in any pure Nash equilibrium, half of the tasks of $S_k$ are scheduled on device k and half of them are scheduled on device k+1. As a result, the load of device k for $k \leq j-1$ is exactly k, and the load of device j from tasks in $S_{j-1}$ is $n_{j-1}/n_j = j-1$.

In any pure Nash equilibrium, half of tasks of $S_j$ go to device j and half of them go to device j+1. This induction step can be shown by contradiction. If in a pure Nash equilibrium, less than half of the tasks in $S_j$ are at device j+1, then the completion time of the last task q of $S_j$ on device j is strictly more than $j-1+n_j/n_j=j$, since all tasks of $S_{j-1}$ will be scheduled before all tasks of $S_j$ on device j. Since only tasks in $S_j$ and $S_{j1}$ can be scheduled on device j+1 and $q \in S_j$ will be scheduled before any task $S_{j+1}$, if q moves to device j+1, its completion time is at most $n_j/n_{j+1}=j$. Therefore, q has incentive to switch to device j+1. In addition, if in a pure Nash equilibrium, more than half of the tasks in $S_j$ are scheduled on device j+1, then the completion time of the last task is more than j on device j+1 and such task can move to device j and improve its completion time. This proves the induction step. In addition, the foregoing shows that in any pure Nash equilibrium the makespan of machine m is m, and therefore, the price of anarchy for this instance is at least $m^2$.

Since the shortest-first policy is a strongly local policy, the above theorem implies that the price of anarchy of such policy is at least $m^2$. In addition, one of skill in the art would realize that the set of pure Nash equilibria of the shortest-first policy is equivalent to the output of the shortest-first greedy algorithm. Therefore, the above lower bound implies a lower bound of $m^2$ for the shortest-first greedy algorithm as well. As a result, the price of anarchy of the shortest-first policy is at least $m^2$.

Figure 3:
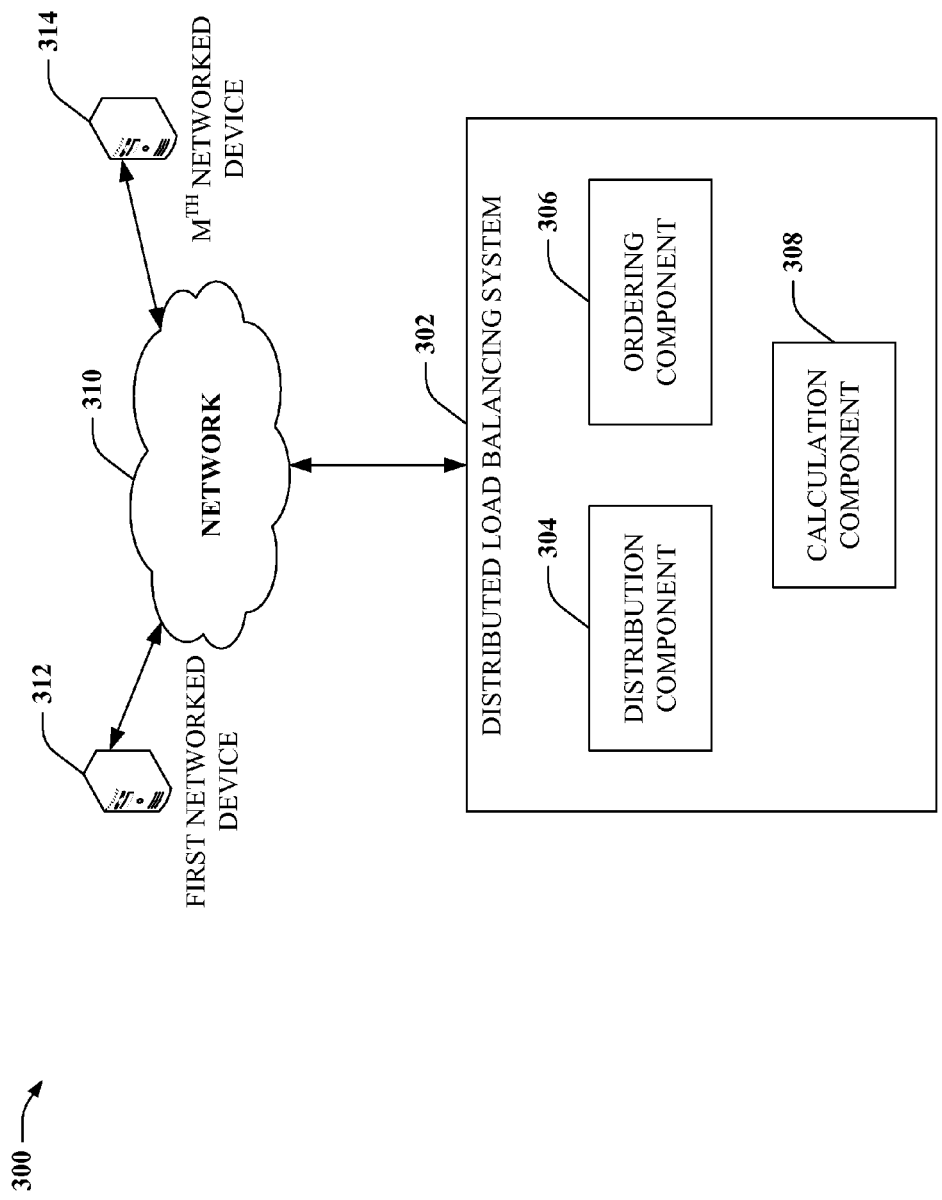
FIG. 3 illustrates an exemplary distributed system with tasks assigned by calculated inefficiency in accordance with the subject disclosure.

FIG. 3 illustrates an exemplary distributed system 300 having tasks scheduled as a result of a calculated inefficiency parameter in accordance with the subject disclosure. System 300 can include a distributed load balancing system 302 that receives tasks at and/or for one or more devices (312, 314) (e.g., by way of a distribution component 304, substantially similar to related components 104, 204 described above at FIGS. 1 and 2) and enforces scheduling policies for such tasks at such devices (312, 314) (e.g., by way of an ordering component 306, also substantially similar to related components 106, 206 described above at FIGS. 1 and 2). System 300 can also include a network 310 for communicatively coupling one or more electronic devices (312, 314). A first networked device 312 can receive a plurality of assigned tasks of a set of tasks. In addition, additional networked devices (e.g., 1, 2 . . . M, where M is an integer) up to an $M^{TH}$ networked device 314 can also receive one or more assigned tasks of the set of tasks.

The scheduling policies enforced by distributed load balancing system 302 can be defined in accordance with a non-decreasing inefficiency parameter as discussed supra. More specifically, such parameter can be determined by a calculation component 308 for a given set of tasks and devices (312, 314). Calculation component 308 can determine a time of completion for a particular task i assigned to a first networked device 312, for instance. For example, calculation component 308 can determine an amount of processing, memory, and/or like resources required to process a task based on prior interaction with similar and/or analogous tasks. In addition, calculation component 308 can, for instance, estimate an amount of resources available at first networked device 312 for processing a job to aid in such determination. Alternatively or in addition, calculation component 308 can reference a stored task completion time (e.g., information compiled in memory, not shown, pertaining to completion times of various tasks on various machines based on available processing, such as a task completion history list) and extrapolate a contemporaneous completion time there from.

Calculation component 308 can further determine a minimum completion time for a particular task on other suitable devices (312, 314) of network 310. By referencing completion times of other devices, for instance in a manner substantially similar to that performed in regard to first networked device 312, calculation component 308 can determine the inefficiency parameter associated with a task assigned to a device 312 of a network 308 of devices (312, 314). More specifically, calculation component can divide the time to process the task on the first device 312 by a minimum time required to process the task on any suitable device on the network 308. In such a manner, system 300 can determine inefficiency parameters associated with each task assigned to each device (312, 314) and enforce an inefficiency-based local policy to lower global completion times as compared to conventional local and strongly local policy mechanisms.

Figure 4:
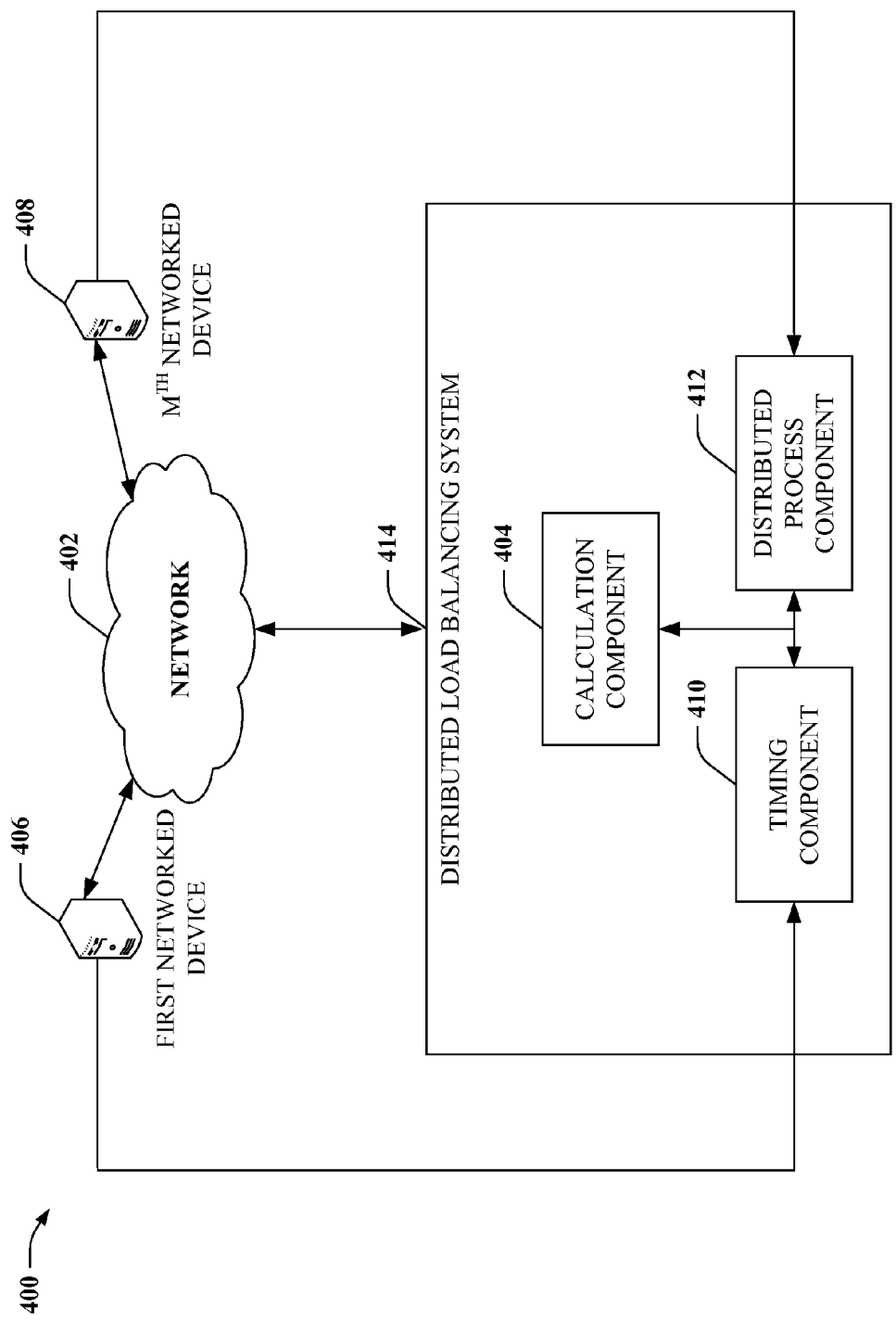
FIG. 4 illustrates a sample system for calculating inefficiency of a set of tasks assigned to distributed machines in accord with aspects disclosed herein.

FIG. 4 depicts further embodiments of the subject innovation in accord with particular aspects described herein. System 400 can reduce a global completion time of a set of tasks assigned to disparate devices on a distributed network 402 by ordering such tasks as a function of non-decreasing inefficiency, as described herein. System 400 can further employ a calculation component 404 to determine a task inefficiency parameter for each task assigned to a first networked device 406 by dividing the time to process the task at the first device 404 by the minimum time to process the task at any of M networked devices (408).

Calculation component 404 can employ a timing component 410 in conjunction with the first networked device 406 that can monitor processes of the first device 406 so as to provide a contemporaneous completion time for a task assigned to such device (406) or to other networked devices (408). More specifically, timing component 410 can determine (e.g., by measuring, calculating, or the like) a contemporaneous processing speed associated with the first device 406 at a given point in time. Such processing speed can fluctuate based on an amount of memory available, contemporaneous processor usage, availability of distributed processing, or like circumstances. It should be appreciated that timing component can be located proximate first networked device 406, proximate network 402, separate yet communicatively coupled with such device or network, and/or proximate interactions between such device and network. It should further be appreciated that calculation component 404 can employ multiple timing components (410) to determine local processing capabilities for each device (406, 408) of a distributed network 402.

Calculation component 404 can further employ a distributed process component that can cross-reference one or more tasks with processing capabilities of all devices (406, 408) on a distributed network 402. For instance, distributed process component 412 can reference a timing component (410) associated with each device (406, 408) to determine local processing capabilities of such device(s). Alternatively, or in addition, distributed process component 412 can provide a task to each device and request a test be performed at such device(s) to approximate completion time. As another example, a database (not depicted) with stored completion times for various tasks on various devices (406, 408) can be referenced to approximate a completion time for a task on each device (406,

408). Distributed process component 412 can compile completion times for each task of a set of tasks on each device (406, 408) and provide such compilation to calculation component 404. Alternatively, or in addition, distributed process component 412 can further store such compilation for future determination(s).

Calculation component 404 can receive information determined at timing component 410 and distributed process component 412 to calculate task inefficiency for each task on each device (406, 408) of the distributed network 402. In such a manner, distributed load balancing system 414 can organize local ordering policies related to non-decreasing order of inefficiency as described herein. As a result, system 400 can effectuate increased global efficiency for completion of tasks assigned by independent agents in accord with various aspects disclosed herein.

Figure 5:
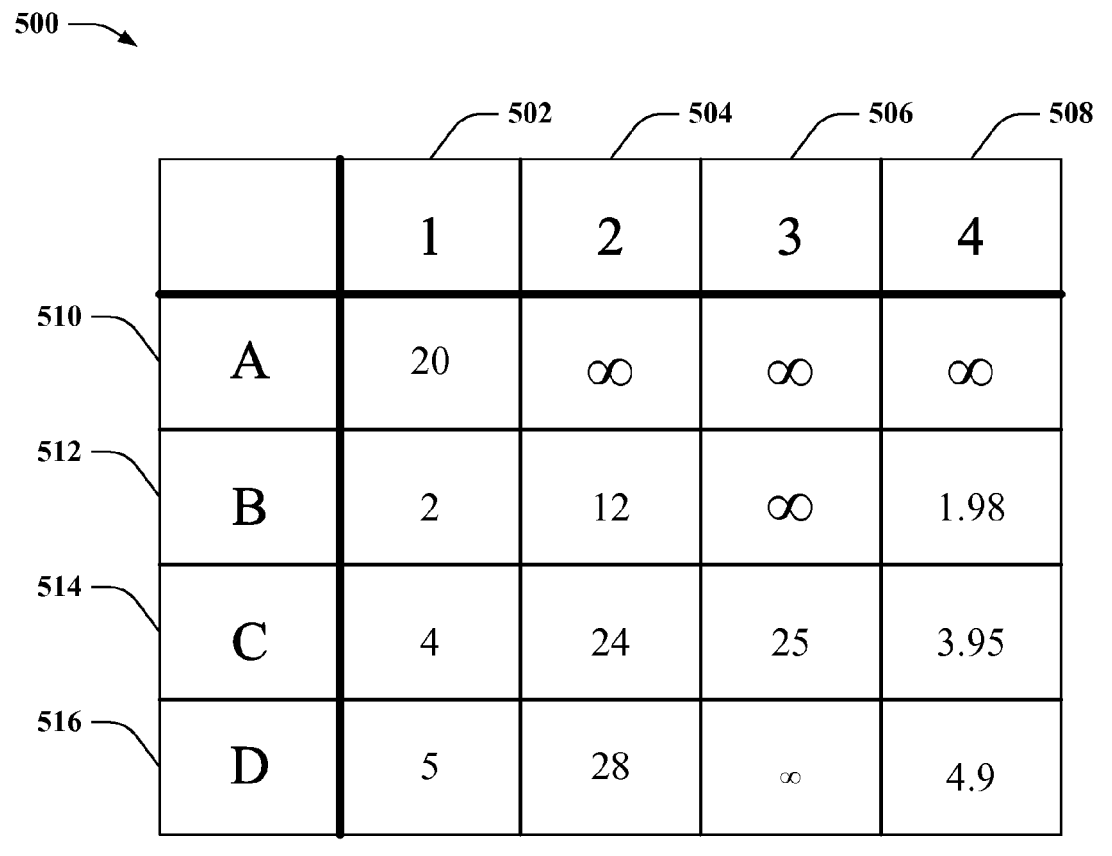

FIG. 5 illustrates a sample table 500 of data related to an example processing scenario lacking pure Nash equilibria in accord with embodiments described herein. More specifically, FIG. 5 depicts a table 500 representing processing times of four tasks A, B, C, and D (510-516) on four machines 1, 2, 3, and 4 (502-508) for a R∥$C_{max}$ game instance. The game instance has a total of four machines 1-4 (502-508) and five tasks A, B, C, D (510-516) and T (not depicted). Task T can only be scheduled on machine 4 (508) and has processing time of 50. Additionally, the ordering on machine 4 is T, B (512), C (514), D (516), A (510).

Pure Nash equilibria may not exist for some strategic games (e.g., see FIGS. 1 and 2 for more detailed discussion of Nash equilibria), and even if equilibria exist for a game, a sequence of best responses of agents may not converge to one of the equilibria. Potential games can be defined as games for which a potential function can be found that maps any state (or, e.g., set of agent strategies) in the game to a number (or a vector) such that after any best response of any agent the value of the function decreases (e.g., strictly and/or lexicographically decreases). Potential games possess pure Nash equilibria and any random sequence of best responses of agents for a potential game converges to pure Nash equilibria with probability one.

The corresponding game of any ordering policy for B∥$C_{max}$ is a potential game and thus, such game possesses pure Nash equilibria (although this is not the case for R∥$C_{max}$, even for systems limited to two machines). Moreover, a game corresponding to an inefficiency-based policy, as described herein, for two machines always possesses pure Nash equilibria. This is not true, however, for a game having any number of machines. Specifically, the corresponding game to inefficiency-based policy for R∥$C_{max}$ may not possess any pure Nash equilibrium.

In regard to the sample game depicted at FIG. 5, the ordering of jobs in the inefficiency-based policy for machine 1 is (A, B, C, D, T) and for machine 2 is (D, B, C, A, T), and for machine 3 is (C, A, B, D, T). For the game example depicted, no pure Nash equilibria exist. More specifically, task T is always scheduled on machine 4 and no other task is motivated to go to machine 4. Consequently, a schedule on four machines as a sequence of subsets of jobs in each machine can be shown. For example, if jobs A, B, and C are on machine 1, job D is on machine 2, and job T is on machine 4. The representative sequence is therefore (ABC, D, T). From this schedule, job C has incentive to switch to machine 3, and the resulting schedule is (AB,D,C,T). This move can be shown by (ABC, D,,T)→(AB,D,C,T). Similarly, (ABD,,C, T)→(ABD, C,,T)→(AD,BC,,T)→(ACD, B,,T)→(AD, DB,,T)→(ABC, D,,T)→(AB, D, C, T)→(ABD,,C, T). Also, (AD, B, C, T)→ (ACD, B,, T). Because no Nash equilibria exist for this pure inefficiency-based system, a coordination mechanism for scheduling tasks introducing a low price of anarchy to the inefficiency based mechanism, which can converge to pure Nash equilibria, can be beneficial.

Figure 6:
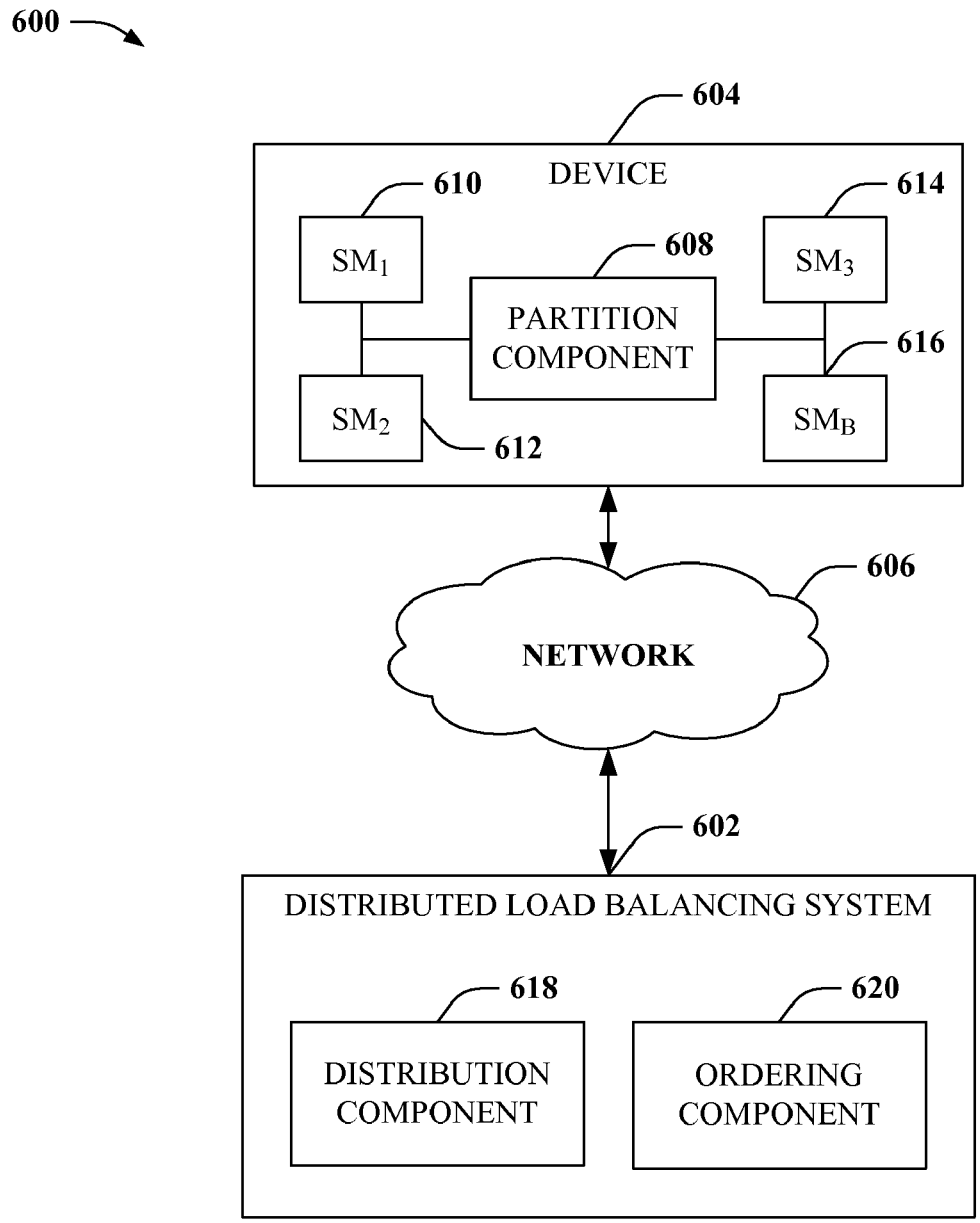
FIG. 6 is an example system employing artificial intelligence to automate aspects of task scheduling for a distributed system in accord with aspects of the subject disclosure.

FIG. 6 depicts an example block diagram of a system 600 that coordinates conventional local scheduling with an inefficiency based policy to ensure convergence to pure Nash equilibria in accord with aspects of the subject innovation. As described herein, local ordering based on non-decreasing inefficiency can decrease price of anarchy of a set of independently assigned tasks from Θ(m), as exhibited by strongly localized policies, to Θ(log m) (e.g., see FIGS. 1 and 2 for a more detailed discussion of price of anarchy in conjunction with strongly localized and localized policies). However, a system ordered by non-decreasing inefficiency can be constructed having no pure Nash equilibrium for the tasks. Consequently, such a system may not converge (e.g., as described supra a Nash equilibrium indicates an optimal strategy for a given agent that cannot unilaterally be improved; a system that does not converge however could incorporate ambiguities into a given completion time algorithm).

System 600 can employ a partition component that segments one or more devices (604) on a network 606 into a number, b, of virtual devices 610, 612, 614, 616, (e.g., where b=⌈log m⌉ virtual devices, where m is a number of devices 604) such that each virtual device (610, 612, 614, 616) only processes tasks having a range of task inefficiency parameters. Particularly, device 604 can be any suitable processor-based device that can communicatively couple to a network 606 and be assigned tasks for processing. In addition, device 604 can represent a plurality of such networked devices, {1 . . . m}, (604), each having a number of virtual machines, b, such that the total number of virtual machines associated with system 600 can be m*b.

Distributed load balancing system 602 can receive tasks assigned by independent agents at device(s) 604 (e.g., by way of distribution component 618) and establish ordering policies for device(s) 604 and virtual machines 610-616, so as to complete the tasks with a minimum price of anarchy for the particular system (600). As a particular example to provide context for the subject disclosure, but not to limit the subject disclosure to the embodiment described, each device (604) can be partitioned into b=⌈log m⌉ virtual machines 610-616. Virtual machine l for 0≦l≦b−1 (610-616) of device j (604) is distributed tasks only of inefficiency of at least $2^l$ and strictly less than $2^{l+1}-1$. Device j (604) can continuously allocate a same amount of time for each of its virtual machines (610-616) (e.g., even if there are no tasks to process on the virtual machine, as pre-emption and idle time can be avoided as a result). A task assigned to device j (604) can run on virtual machine l(610-616) of device j (604) where l=⌊$e_{ij}$⌋ given that $e_{ij}$≦m. If $e_{ij}$≧m, the task will be delayed for ever on device j (604). To complete a description of processing strategy utilized by distributed load balancing system 602, an order in which each virtual machine (610-616) processes its tasks can be defined. If processing order is arbitrary, such process can be classified as a local random-order policy. If the processing order follows a shortest in efficiency first logic, it can be classified as a local shortest-first policy.

Given an instance of the unrelated device problem, R∥$C_{max}$, on m devices (604), a corresponding instance of tasks assigned to m*b virtual machines (610-616) can be created as follows: if in the original instance, task i has processing time $p_{ij}$, then it would have processing time $bp_{ij}$ on virtual machines $l_j$ (610-616) of device j (604) where $l_j$=⌊$e_{ij}$⌋ and given that $e_{ij}$<m. On all other virtual machines (610-616) of device j (604) (in case $e_{ij} \geq m$ on all virtual machines of j), processing time for task i is infinite.

For an instance described above of an $R\|C_{max}$ problem and corresponding instance on m*b virtual machines (610-616): a given assignment for an original instance on m devices (604) can yield an assignment for a corresponding instance on m*b virtual machines (610-616) while increasing the makespan by a factor $\leq 2b$. In particular, an optimal makespan increases by a factor of at most 2b. Furthermore, an assignment for the corresponding instance on m*b virtual machines (610-616) can yield an assignment for the original instance where completion time of each task remains the same (and in particular the makespan does not increase).

As a result of the foregoing, the price of anarchy for $R\|C_{max}$ using random-order processing is $O(\log^2 m)$. In particular, the price of anarchy for unrelated machines using shortest-first processing is also $O(\log^2 m)$. Furthermore, the price of anarchy for $R\|C_{max}$ shortest-first processing is at least $\log^2 m$. Moreover, the local policies described above applied by distributed load balancing system 602 converge to a Nash equilibrium very fast. Specifically, the corresponding game for the shortest-first policy is a potential game. Additionally, any sequence of best responses of agents consisting of n rounds of all agents converges to a pure Nash equilibrium.

Figure 7:
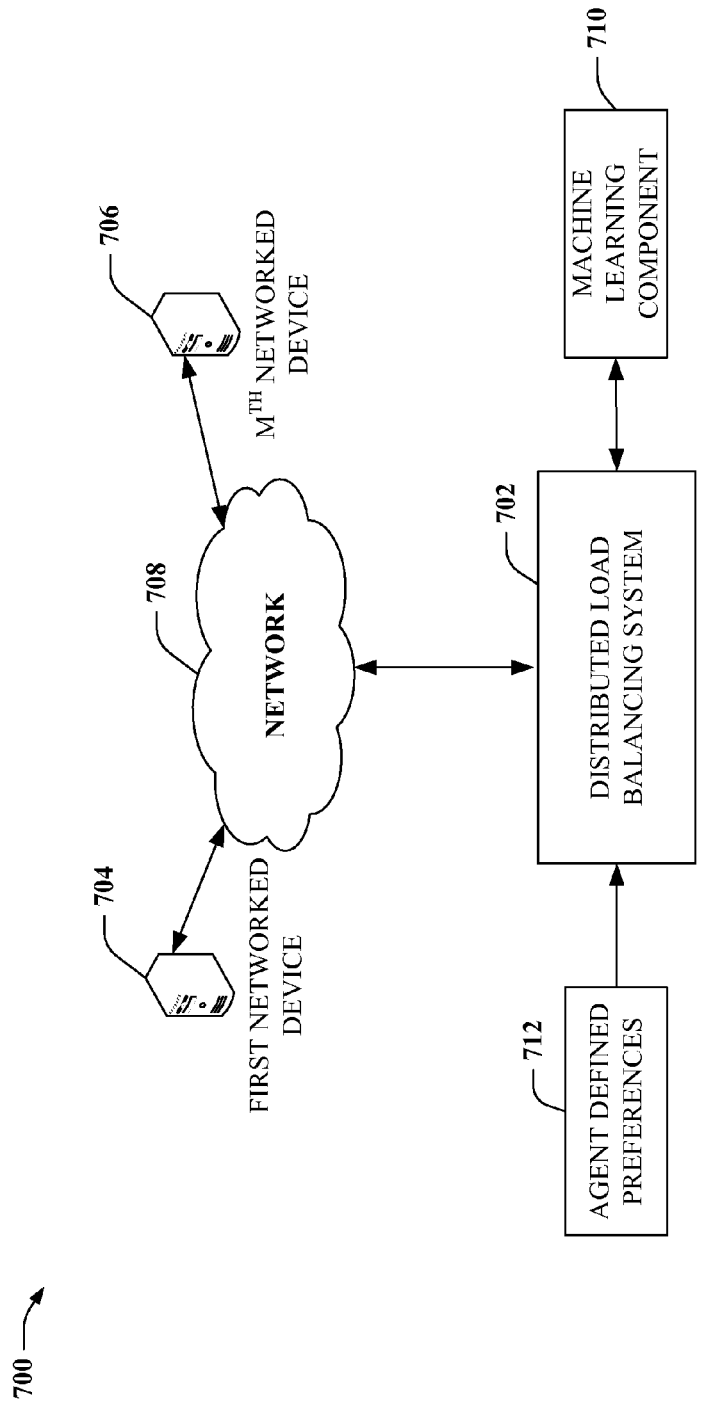
FIG. 7 depicts an example system that can optimize particular system variables of distributed processing systems in accord with additional aspects of the claimed subject matter.

FIG. 7 is an example system 700 employing artificial intelligence (710) to automate aspects of task scheduling for a distributed system in accord with aspects of the subject disclosure. Distributed load balancing system 702 can receive and schedule tasks assigned by strategic agents among network 708 devices (704, 706) as described herein. Specifically, such scheduling can be in accord with non-decreasing inefficiency associated with each task, and/or in accord with a shortest-first or random-order scheduled inefficiency parameter for virtual machines (not shown) of devices 704 and 706 as described in more detail, supra.

Additionally, distributed load balancing system 702 can incorporate a machine learning (ML) component 710 that can store and reference information related to assignments of particular tasks to particular devices and assist agent(s) in allocating tasks to devices (704, 706). As an example, an agent can have stored preferences 712 defined by the agent indicating a preferred device for task assignment (e.g., a particular device 704 can have preferred functionality such as processing speed, memory, resolution, quality, etc.). ML component 710 can reference agent defined preferences 712, and assignment history, for instance, associated with an agent or multiple agents and make a strategic determination of what device (704, 706) a particular agent would select. Such determination can facilitate, for instance, optional auto-completion of the task assignment, or a device proposal to an agent for a particular task for auto-completion by the agent, or like procedure. In such a manner, system 700 can anticipate a likely task assignment and, for instance, increase efficiency of task assignment.

To make strategic determinations about an anticipated choice of device (704, 706) by an agent, or similar determination, the ML component 710 can utilize a set of models (e.g., agent preference model, task assignment history model, general assignment models of all agent-assigned tasks, etc.) in connection with determining or inferring which devices (704, 706) are to be assigned a given task by a given agent. The models can be based on a plurality of information (e.g., agent specified preferences 710, prior assignments weighted as a function of frequency of assignment for a particular task, assignment histories of an agent, contemporaneous processing capabilities of a device, inefficiency parameter associated with a task and device network as described herein, etc. . . . ).

Optimization routines associated with ML component 710 can harness a model that is trained from previously collected data, a model that is based on a prior model that is updated with new data, via model mixture or data mixing methodologies, or simply one that is trained with seed data, and thereafter tuned in real-time by training with actual field data during agent task assignment or data compiled from global task assignment.

In addition, ML component 710 can employ learning and reasoning techniques in connection with making determinations or inferences regarding optimization decisions and the like. For example, ML component 710 can employ a probabilistic-based or statistical-based approach in connection with choosing between inefficiency parameters associated with a network of devices, optionally auto-completing an assignment as a function of device/task inefficiency, offering an agent a particular device for auto-completion, etc. The inferences can be based in part upon explicit training of classifier(s) (not shown) before employing the system 702, or implicit training based at least upon a device user's previous input, choices, and the like during use of the device. Data or policies used in optimizations can be collected from specific users or from a community of users and their devices, provided by one or more device service providers, for instance.

ML component 710 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Methodologies employed by ML component 710 can also include mechanisms for the capture of logical relationships such as theorem provers or more heuristic rule-based expert systems. Inferences derived from such learned or manually constructed models can be employed in optimization techniques, such as linear and non-linear programming, that seek to maximize some objective function. For example, maximizing efficiency of task assignment as a function of projected inefficiency parameter and related time to completion, shortest-first or random-order inefficiency based scheduling and time to completion, as described herein, incorporating agent assignment history and global assignment history, as well as like factors suitable for such optimizations.

Figure 8:
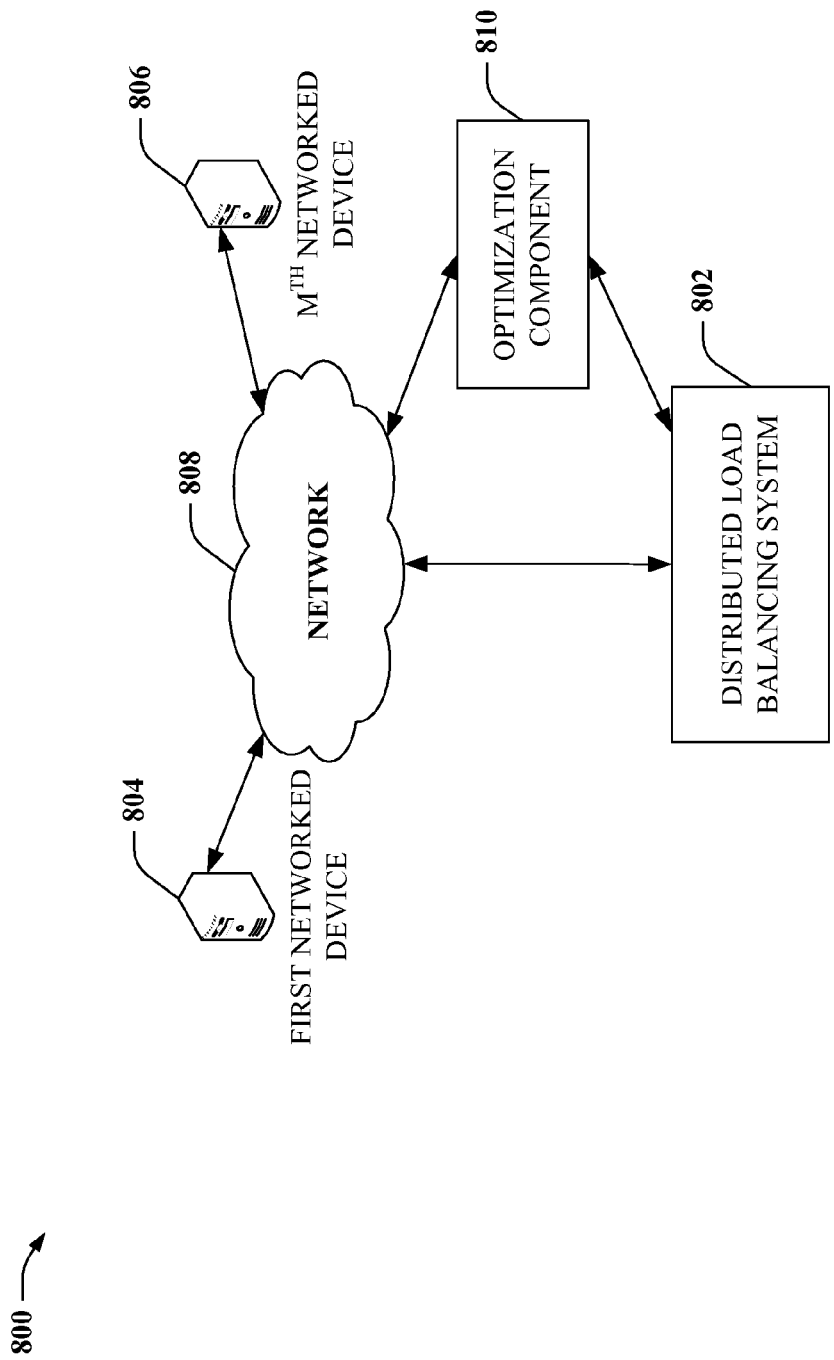
FIG. 8 illustrates an example processing scenario lacking pure Nash equilibria in accord with embodiments described herein.

FIG. 8 depicts an example system that can optimize particular system variables of distributed processing systems in accord with additional aspects of the claimed subject matter. Distributed load balancing system 802 can receive and schedule tasks assigned by strategic agents among network 808 devices (804, 806) as described herein. Specifically, such scheduling can be in accord with non-decreasing inefficiency associated with each task, and/or in accord with a shortest-first or random-order scheduled inefficiency parameter for virtual machines (not shown) of devices 804 and 806 as described in more detail, supra.

Optimization component 810 can provide real-time closed loop feedback of a state of network 808 and networked devices 804, 806. More specifically, optimization component 810 can monitor a number of tasks assigned to each device (804, 806) of network 808 and receive and compile a list of concurrent task inefficiencies of tasks assigned to such devices. Device loading can be forwarded to distributed load balancing system 802 to facilitate an accurate representation of device processing times utilized to calculate such task inefficiencies. Task inefficiencies, which can dynamically change as a function of processing capability of a device (804), and with respect to all other networked devices (806), can also be provided to agents (or, e.g., to a machine learning component 614) to facilitate accurate representation of a contemporaneous state of a system. Accurate representation can be important to assist an agent in determining a device that meets selfish desires of an agent. In addition, knowledge of a concurrent state of a system can assist a distributed load balancing system 802 in adjusting task scheduling as task inefficiencies change. In the manner described, system 800 can optimize task assignment by agents as well as scheduling by system 802 by providing steady state feedback of a current state of a distributed network and corresponding devices.

Figure 9:
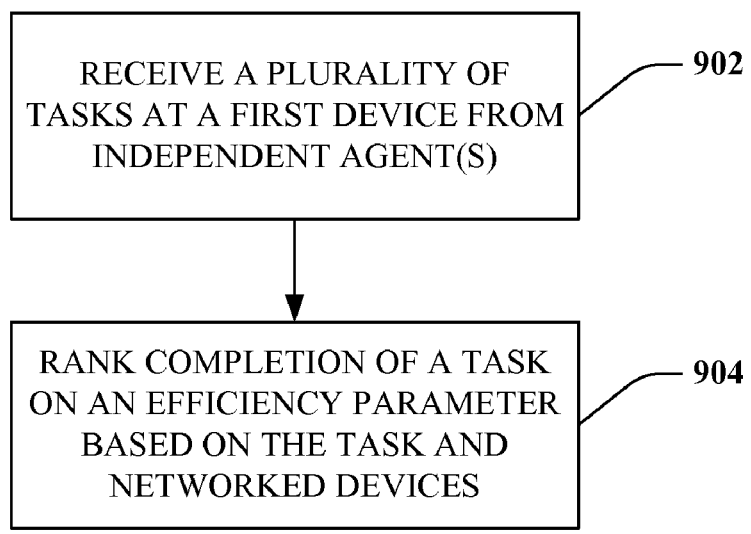
FIG. 9 depicts an exemplary methodology for load balancing in distributed systems in accord with aspects of the subject innovation.
Figure 10:
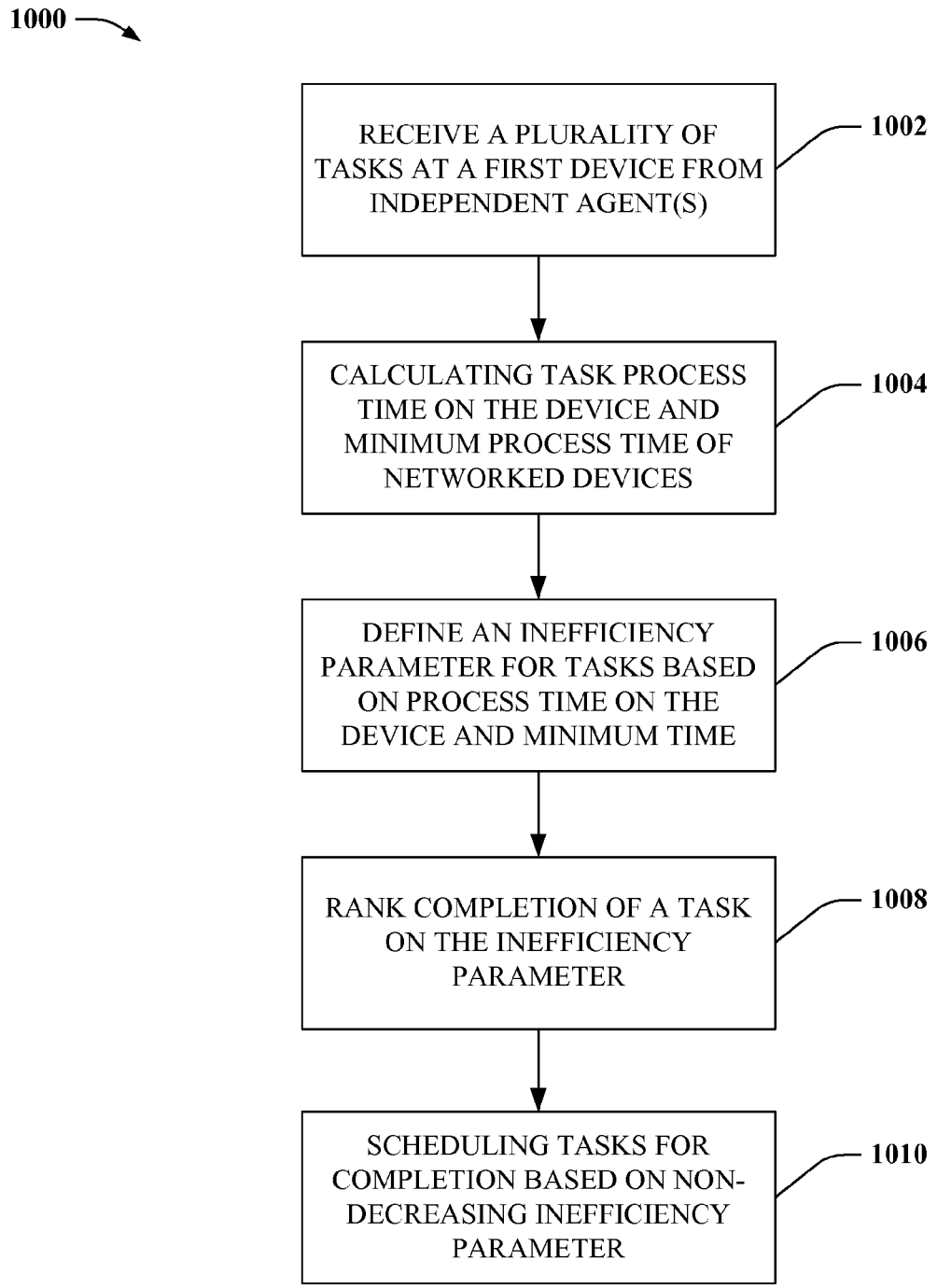
FIG. 10 is an example methodology illustrating a process for determining local policies based on task inefficiency in accord with aspects disclosed herein.
Figure 11:
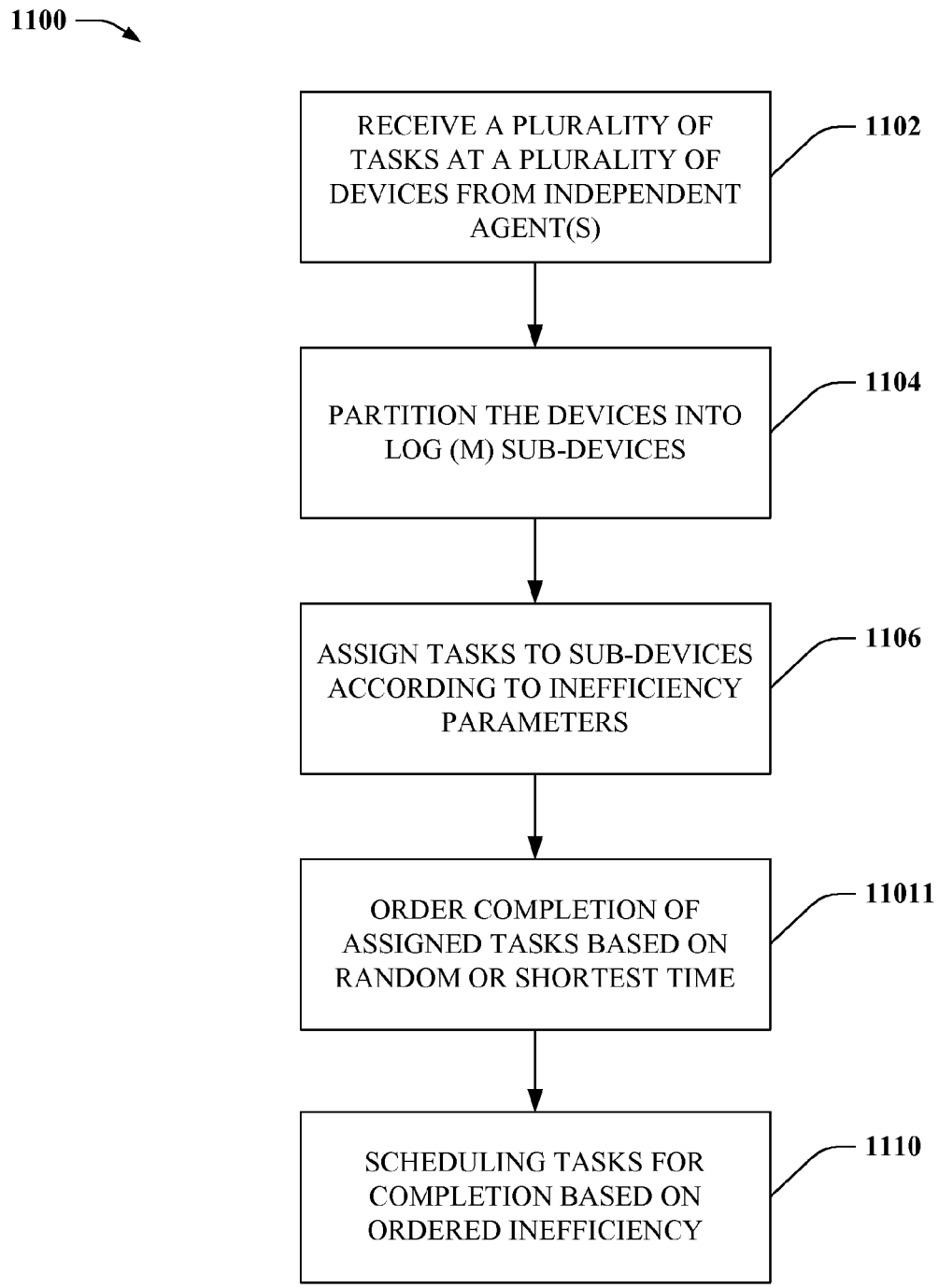
FIG. 11 depicts an example methodology for harmonizing traditional scheduling and inefficiency-based scheduling of distributed systems in accord with aspects of the claimed subject matter.

FIGS. 9-11 depict example methodologies according to innovative aspects of the subject disclosure. While, for purposes of simplicity of explanation, the methodologies shown herein, e.g., in the form of flow charts or flow diagrams, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring now to FIG. 9 an exemplary methodology for load balancing in distributed systems in accord with aspects of the subject innovation is depicted. At 902, a plurality of tasks is received at a first device from one or more independent agents. Such tasks can include any suitable electronically process-able application, function, communication, or the like. Examples can include print jobs distributed by multiple networked computers, network searches distributed to networked search engines, web-based purchases proffered to various servers configured to verify supplier inventory and/or purchaser credit, and the like. Moreover, the first device can include any suitable electronic processing component, thread, executable, or combination thereof, capable of communicating with remote devices across a network, and further capable of being assigned a job via an electronic process, etc., over the network. The one or more independent agents, in accord with embodiments of FIG. 9, are self-interested entities motivated only to assign a task owned by the agent in a manner that decreases completion time of that task.

At 904, methodology 900 can rank completion of the plurality of tasks on an inefficiency parameter associated with each task, where the inefficiency parameter is based at least in part on completion time of each task on a device, and completion time of each task on other suitable networked devices. More specifically, ranking can be in non-decreasing order of inefficiency parameter. Furthermore, the inefficiency parameter can be calculated as a function of processing time of a particular task on the first device divided by the minimum processing time for that task on a suitable device. In such a manner, methodology 900 can effectuate scheduling of independent tasks assigned by selfish entities so as to decrease the overall global time of completion of all scheduled tasks as compared with conventional mechanisms.

FIG. 10 is an example methodology illustrating a process for determining local policies based on task inefficiency in accord with aspects disclosed herein. At 1002, a plurality of tasks can be received at a first device from one or more independent agents. At 1004, task process time on the first device and minimum process time for all suitable devices can be calculated. At 1006, an inefficiency parameter can be defined for tasks based on process time on the first device and minimum process time. More specifically, the inefficiency parameter can be a ratio of such process time on the first device and minimum process time. At 1008, completion of a task can be ranked based on the inefficiency parameter. In addition, order of completion for the plurality of tasks can be ranked based on an inefficiency parameter(s) associated with each of the plurality of tasks. At 1010, tasks are scheduled for completion based on non-decreasing order of the inefficiency parameter(s) associated with each task. As a result, methodology 1000 can motivate independent agents to assign tasks so as to most effectively utilize distributed processing resources of a distributed network.

FIG. 11 depicts an example methodology for harmonizing traditional scheduling and inefficiency-based scheduling of distributed systems in accord with aspects of the claimed subject matter. At 1102 a plurality of tasks can be received at a plurality of devices from independent agents. At 1104, the devices can be partitioned into $\lceil \log m \rceil$ virtual machines. At 1106, each task of the plurality of tasks is assigned to a virtual machine of each device in accordance with an inefficiency parameter of each task. At 1108, completion of assigned tasks is ordered based on shortest-first or random-order mechanisms. At 1110, tasks are scheduled for completion based on ordered inefficiency. In such a manner methodology 1100 can ensure that strategic assignments of tasks by independent agents can converge to Nash equilibria in accordance with the subject disclosure.

Figure 12:
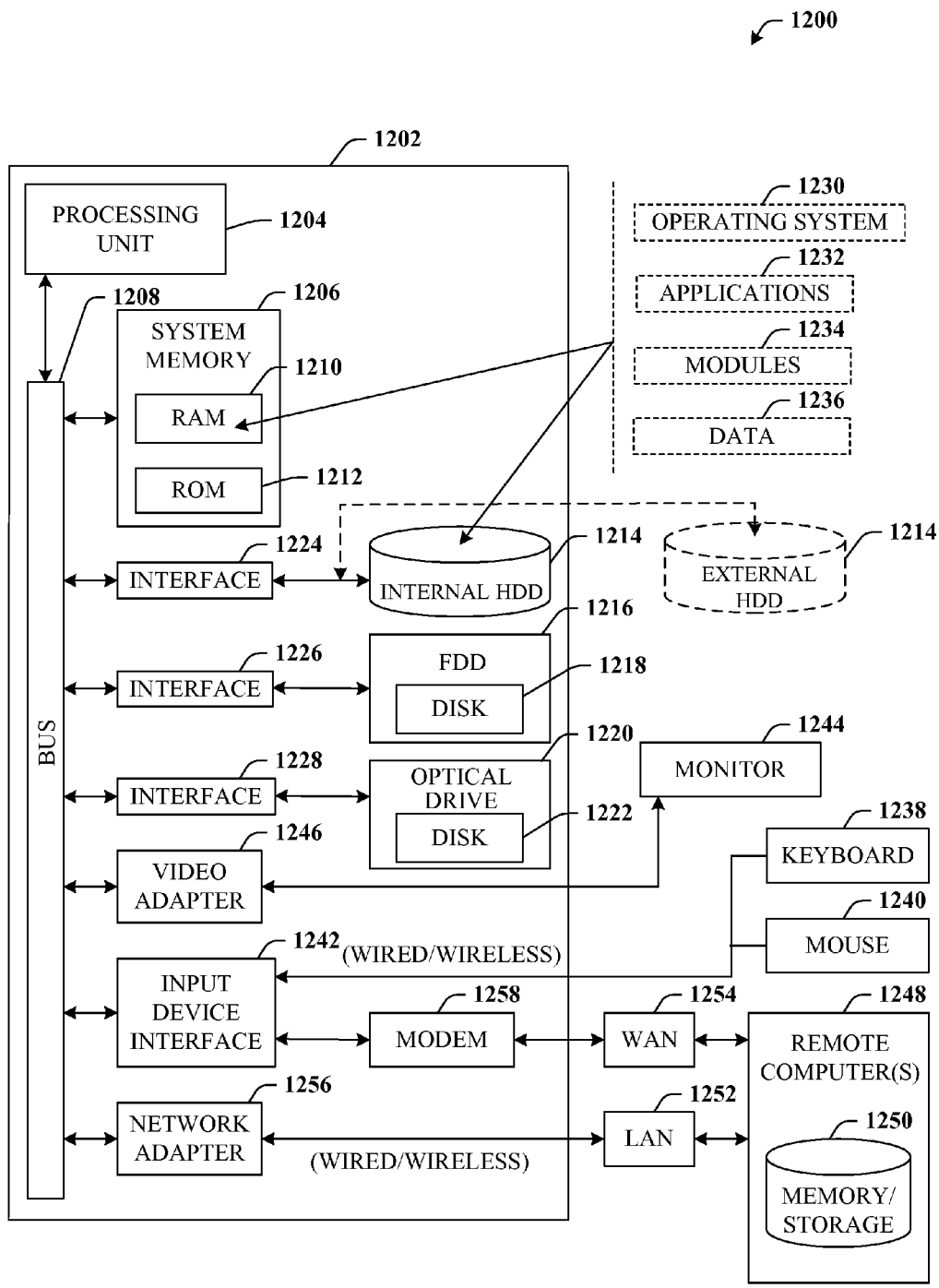
FIG. 12 illustrates a sample operating environment of a distributed system in accord with aspects of the subject innovation.

Referring now to FIG. 12, there is illustrated a block diagram of an exemplary computer system operable to execute the disclosed architecture. In order to provide additional context for various aspects of the subject invention, FIG. 12 and the following discussion are intended to provide a brief, general description of a suitable computing environment 1200 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the invention includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a nonvolatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject invention.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 9BaseT wired Ethernet networks used in many offices.

Figure 13:
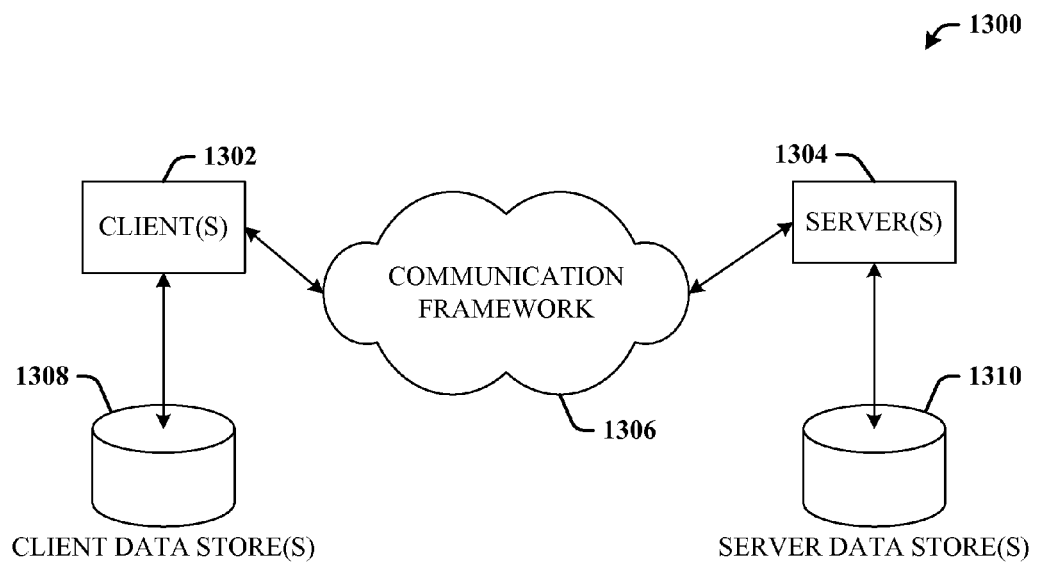
FIG. 13 illustrates an example networking environment for interconnecting distributed processes in accordance with aspects of the claimed subject matter.

Referring now to FIG. 13, there is illustrated a schematic block diagram of an exemplary computer compilation system operable to execute the disclosed architecture. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that load balances tasks assigned by self-interested agents to a plurality of machines on a network, comprising:
  a processor;
  a memory operatively coupled to the processor for executing components;
  a distribution component that receives a plurality of tasks at a machine, assigned to the machine by at least one self-interested agent, on a network of a plurality of machines;
  an ordering component that schedules each of the plurality of tasks for processing on the machine in a non-decreasing order of task inefficiency; and
  a calculation component that determines task inefficiency for an individual task by dividing the time to process the task on the machine by the minimum time for any of the plurality of machines to process the task.

2. The system of claim 1, comprising a timing component that determines the time to process the individual task on the machine.

3. The system of claim 1, comprising a distributed process component that determines the minimum time for any of the plurality of machines to process the individual task.

4. The system of claim 1, the calculation component determines task inefficiency for each of the plurality of tasks assigned to the machine as a result of a time to process each of the tasks on the machine and minimum time to process each of the tasks.

5. The system of claim 1, the plurality of tasks is assigned by a plurality of self-interested agents.

6. The system of claim 1, further comprising a partition component that subdivides the machine into a plurality of virtual machines that can simultaneously process the plurality of tasks assigned to the machine.

7. The system of claim 6, the number of virtual machines, b, is equal to $\lceil \log m \rceil$, where m is the number of the plurality of machines.

8. The system of claim 6, the distribution component assigns the individual task to a virtual machine of the machine if the task inefficiency for the task on the machine is less than the number of the plurality of machines.

9. The system of claim 8, the distribution component assigns the individual task to the virtual machine if task inefficiency associated with the individual task is greater than or equal to $2^l$ and strictly less than $2^{l+1}-1$, where l has values that range from 0 to b−1.

10. The system of claim 6, the individual task is scheduled on the plurality of virtual machines in random order of inefficiency.

11. The system of claim 6, the individual task is scheduled on the plurality of virtual machines in increasing order of inefficiency.

12. A method for load balancing a plurality of distributed, networked machines having tasks assigned by independent strategic agents, comprising:
   receiving a plurality of tasks at a first networked device assigned by two or more independent strategic agents; and
   ranking a task for completion based on an inefficiency parameter that is a function of the task and of resources available to the first device and at least one additional networked device, wherein the inefficiency parameter is calculated by dividing the time required to process the task on the first device by the minimum time required to process the task on any suitable device networked with the first device.

13. The method of claim 12, comprising scheduling the plurality of tasks for completion on the first device in order of non-decreasing inefficiency parameter such that least inefficient tasks are completed first and most inefficient tasks are completed last.

14. The method of claim 13, comprising coordinating a shortest time first algorithm or a random time algorithm with the inefficiency parameter so that a local machine policy minimizing global completion time of a plurality of tasks scheduled to a plurality of networked machines by a plurality of independent strategic agents converges to pure Nash equilibria.

15. A computer storage media having computer-executable instructions recorded thereon, the computer-executable instructions, upon execution to configure a computer for load balancing a plurality of tasks on a plurality of distributed machines, by performing operations comprising:
   receiving a plurality of tasks at a first networked device assigned by two or more independent strategic agents;
   ranking a task for completion based on an inefficiency parameter that is a function of the task and of resources available to the first device and at least one additional networked device; and
   calculating the inefficiency parameter that divides the time required to process the task on the first device by the minimum time required to process the task on any suitable device networked with the first device.

16. The computer storage media of claim 15, the operations further comprising coordinating a shortest time first algorithm or a random time algorithm with the inefficiency parameter so that a local machine policy minimizing global completion time of a plurality of tasks scheduled to a plurality of machines by a plurality of independent strategic agents converges to pure Nash equilibria.

17. The computer storage media of claim 15, the operations further comprising scheduling the plurality of tasks in order of non-decreasing inefficiency parameter as determined by the means for ranking.

18. A system that load balances tasks assigned by self-interested agents to a plurality of machines on a network, comprising:
   a processor;
   a memory operatively coupled to the processor for executing components;
   a distribution component that receives a plurality of tasks at a machine, assigned to the machine by at least one self-interested agent, on a network of a plurality of machines;
   an ordering component that schedules each of the plurality of tasks for processing on the machine in a non-decreasing order of task inefficiency; and
   a partition component that subdivides the machine into a plurality of virtual machines that can simultaneously process the plurality of tasks assigned to the machine, the number of virtual machines, b, is equal to $\lceil \log m \rceil$, where m is the number of the plurality of machines.

19. A system that load balances tasks assigned by self-interested agents to a plurality of machines on a network, comprising:
   a processor;
   a memory operatively coupled to the processor for executing components;
   a distribution component that receives a plurality of tasks at a machine, assigned to the machine by at least one self-interested agent, on a network of a plurality of machines;
   an ordering component that schedules each of the plurality of tasks for processing on the machine in a non-decreasing order of task inefficiency; and
   a partition component that subdivides the machine into a plurality of virtual machines that can simultaneously process the plurality of tasks assigned to the machine, the distribution component assigns an individual task to a virtual machine of the machine if the task inefficiency for the individual task on the machine is less than the number of the plurality of machines.

20. A method for load balancing tasks, comprising:
   receiving, a plurality of tasks at a machine, assigned to the machine by at least one self-interested agent, on a network of a plurality of machines;
   scheduling each of the plurality of tasks for processing on the machine in a non- decreasing order of task inefficiency; and
   subdividing the machine into a plurality of virtual machines that can simultaneously process the plurality of tasks assigned to the machine, an individual task of the plurality of tasks being scheduled on the plurality of virtual machines in random order of inefficiency.

21. A computer storage media having computer-executable components recorded thereon, the computer-executable components, upon execution to configure a computer for load balancing a plurality of tasks on a plurality of distributed machines, the computer-executable components comprising:
   a distribution component that receives a plurality of tasks at a machine, assigned to the machine by at least one self-interested agent, on a network of a plurality of machines;
   an ordering component that schedules each of the plurality of tasks for processing on the machine in a non-decreasing order of task inefficiency; and
   a partition component that subdivides the machine into a plurality of virtual machines that can simultaneously process the plurality of tasks assigned to the machine, an individual task of the plurality of tasks being scheduled on the plurality of virtual machines in increasing order of inefficiency.

22. A computer storage media having computer-executable instructions recorded thereon, the computer-executable instructions, upon execution to configure a computer for load balancing a plurality of tasks on a plurality of distributed machines, by performing operations comprising:
   receiving a plurality of tasks at a first networked device assigned by two or more independent strategic agents;

ranking a task for completion based on an inefficiency parameter that is a function of the task and of resources available to the first device and at least one additional networked device; and coordinating a shortest time first algorithm or a random time algorithm with the inefficiency parameter so that a local machine policy minimizing global completion time of a plurality of tasks scheduled to a plurality of machines by a plurality of independent strategic agents converges to pure Nash equilibria.

* * * * *

UNITED STATES PATENT AND TRADEMARK OFFICE
CERTIFICATE OF CORRECTION

| | | |
|---|---|---|
| PATENT NO. | : 8,028,293 B2 | Page 1 of 1 |
| APPLICATION NO. | : 11/770667 | |
| DATED | : September 27, 2011 | |
| INVENTOR(S) | : Azar et al. | |

It is certified that error appears in the above-identified patent and that said Letters Patent is hereby corrected as shown below:

In column 22, line 37, in Claim 20, delete "non- decreasing" and insert -- non-decreasing --, therefor.

Signed and Sealed this
Twenty-second Day of November, 2011

David J. Kappos
*Director of the United States Patent and Trademark Office*